(12) United States Patent
Mo

(10) Patent No.: US 11,124,099 B2
(45) Date of Patent: Sep. 21, 2021

(54) SEATING DEVICE

(71) Applicant: Bambino Prezioso Switzerland AG, Steinhausen (CH)

(72) Inventor: Xiao-Long Mo, Guangdong (CN)

(73) Assignee: Bambino Prezioso Switzerland AG, Steinhausen (CH)

( * ) Notice: Subject to any disclaimer, the term of this patent is extended or adjusted under 35 U.S.C. 154(b) by 0 days.

(21) Appl. No.: 16/990,131

(22) Filed: Aug. 11, 2020

(65) Prior Publication Data
US 2021/0061150 A1 Mar. 4, 2021

(30) Foreign Application Priority Data
Sep. 3, 2019 (CN) .......................... 201910836400.9

(51) Int. Cl.
| | | |
|---|---|---|
| *A47C 1/08* | (2006.01) | |
| *A47D 1/10* | (2006.01) | |
| *B60N 2/28* | (2006.01) | |
| *B60N 2/26* | (2006.01) | |
| *B60N 2/818* | (2018.01) | |
| *A47C 7/38* | (2006.01) | |

(52) U.S. Cl.
CPC ............. *B60N 2/818* (2018.02); *A47C 7/38* (2013.01); *B60N 2/2851* (2013.01)

(58) Field of Classification Search
CPC ........ A47C 7/38; B60N 2/2851; B60N 2/286; B60N 2/2866; B60N 2/2872; B60N 2/818
USPC ....................................................... 297/410
See application file for complete search history.

(56) References Cited

U.S. PATENT DOCUMENTS

| | | | | |
|---|---|---|---|---|
| 7,055,903 B2 * | 6/2006 | Balensiefer | .......... | B60N 2/2821 297/256.11 |
| 7,195,314 B2 * | 3/2007 | Spence | ................ | B60N 2/2851 297/188.01 |
| 7,278,683 B2 * | 10/2007 | Williams | ............. | B60N 2/2851 297/250.1 |
| 7,303,232 B1 * | 12/2007 | Chen | ........................ | A47C 7/38 297/284.7 |
| 7,322,647 B2 * | 1/2008 | Munn | ................... | B60N 2/2851 297/250.1 |
| 8,342,604 B2 * | 1/2013 | Heisey | .................. | B60N 2/2812 297/256.1 |
| 8,573,702 B2 * | 11/2013 | Tscherbner | ............ | B60N 2/812 297/410 |
| 8,905,476 B2 * | 12/2014 | Davis | ................... | B60N 2/2866 297/250.1 |
| 10,112,508 B2 * | 10/2018 | Pleiman | ............... | B60N 2/2812 |
| 10,843,605 B2 * | 11/2020 | Johnson | ................ | B60N 2/812 |

(Continued)

*Primary Examiner* — Shin H Kim
(74) *Attorney, Agent, or Firm* — Polsinelli PC

(57) ABSTRACT

A seating device includes a headrest movably connected to a seat body. An adjustment mechanism is provided to adjust the position of the headrest relative to the seat body. An operating unit has a driving member to actuate the adjustment mechanism, and a handle portion bending from the driving member. The driving member is movable between non-operative and operative positions. In the non-operative position, the handle portion abuts against the headrest, and the driving member is inoperative to actuate the adjustment mechanism. In the operative position, the handle portion protrudes outward from the headrest, and the driving member is able to actuate the adjustment mechanism.

13 Claims, 8 Drawing Sheets

(56) References Cited

U.S. PATENT DOCUMENTS

| | | | |
|---|---|---|---|
| 2003/0151282 A1* | 8/2003 | Williams | B60N 2/818 297/250.1 |
| 2005/0212342 A1* | 9/2005 | Kain | B60N 2/2872 297/410 |
| 2005/0225136 A1* | 10/2005 | Horton | B60N 2/815 297/250.1 |
| 2010/0187879 A1* | 7/2010 | Brandl | B60N 2/2872 297/250.1 |

* cited by examiner

SEATING DEVICE

CROSS-REFERENCE TO RELATED APPLICATION

This application claims priority to Chinese Patent Application No. 201910836400.9, filed on Sep. 3, 2019.

FIELD

The disclosure relates to a seating device, and more particularly to a seating device that has an adjustment mechanism for adjustment of a headrest.

BACKGROUND

A child safety seat is commonly installed in a vehicle for ensuring safety of a child in the vehicle. The child safety seat typically includes a seat base, a backrest part, and a headrest part. Generally, a height-adjusting mechanism is disposed between the backrest part and the headrest part, and an operating device is provided to operate the height-adjusting mechanism for adjustment of the height of the headrest part relative to the backrest part. However, the operating device existing in the prior art is disadvantageous in that it is disposed on the child safety seat in a protruding fashion, and is prone to run the risk of being accidentally touched or pressed, which can lead to undesirable movement of the headrest relative to the backrest and hence adverse effect on safety. In addition, the existing operating device protruding from the child safety seat is not aesthetic.

SUMMARY

Therefore, an object of the disclosure is to provide a seating device that can alleviate at least one of the drawbacks of the prior art.

According to the disclosure, a seating device includes a seat body, a headrest, an adjustment mechanism, and an operating unit.

The headrest is movably connected to the seat body.

The adjustment mechanism is connected between the seat body and the headrest to adjust a position of the headrest relative to the seat body.

The operating unit is movably mounted to the headrest and has a driving member to actuate the adjustment mechanism, and a handle portion bending from the driving member. The driving member is movable between a non-operative position and an operative position.

When the driving member is in the non-operative position, the handle portion abuts against an outer surface of the headrest, and the driving member is inoperative to transmit an actuation movement from the handle portion to the adjustment mechanism for actuating the adjustment mechanism.

When the driving member is in the operative position, the handle portion is spaced away and protrudes from the outer surface, and the driving member is operative to transmit the actuation movement to the adjustment mechanism.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
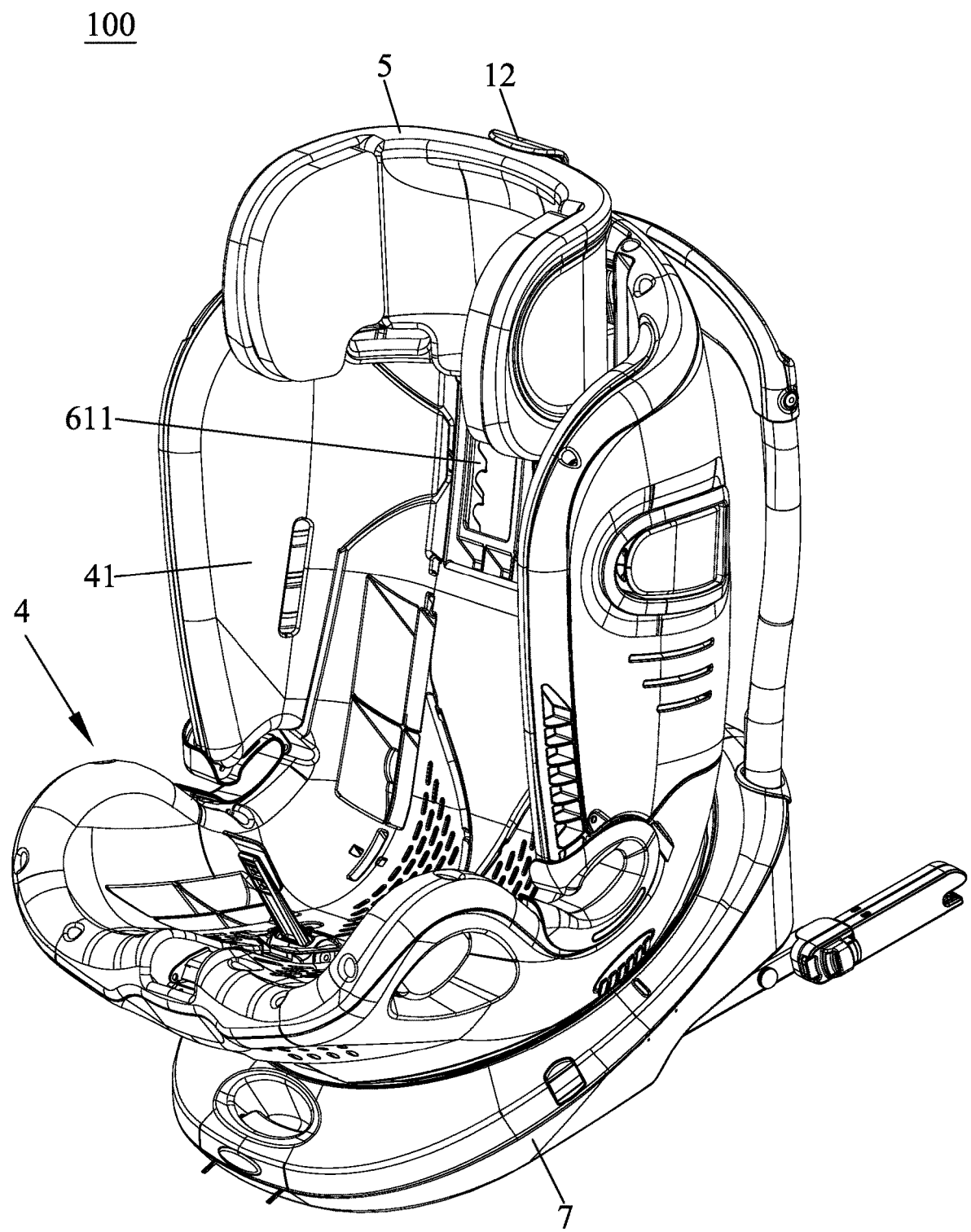
FIG. 1 is a perspective view illustrating a seating device according to an embodiment of the disclosure.
Figure 2:
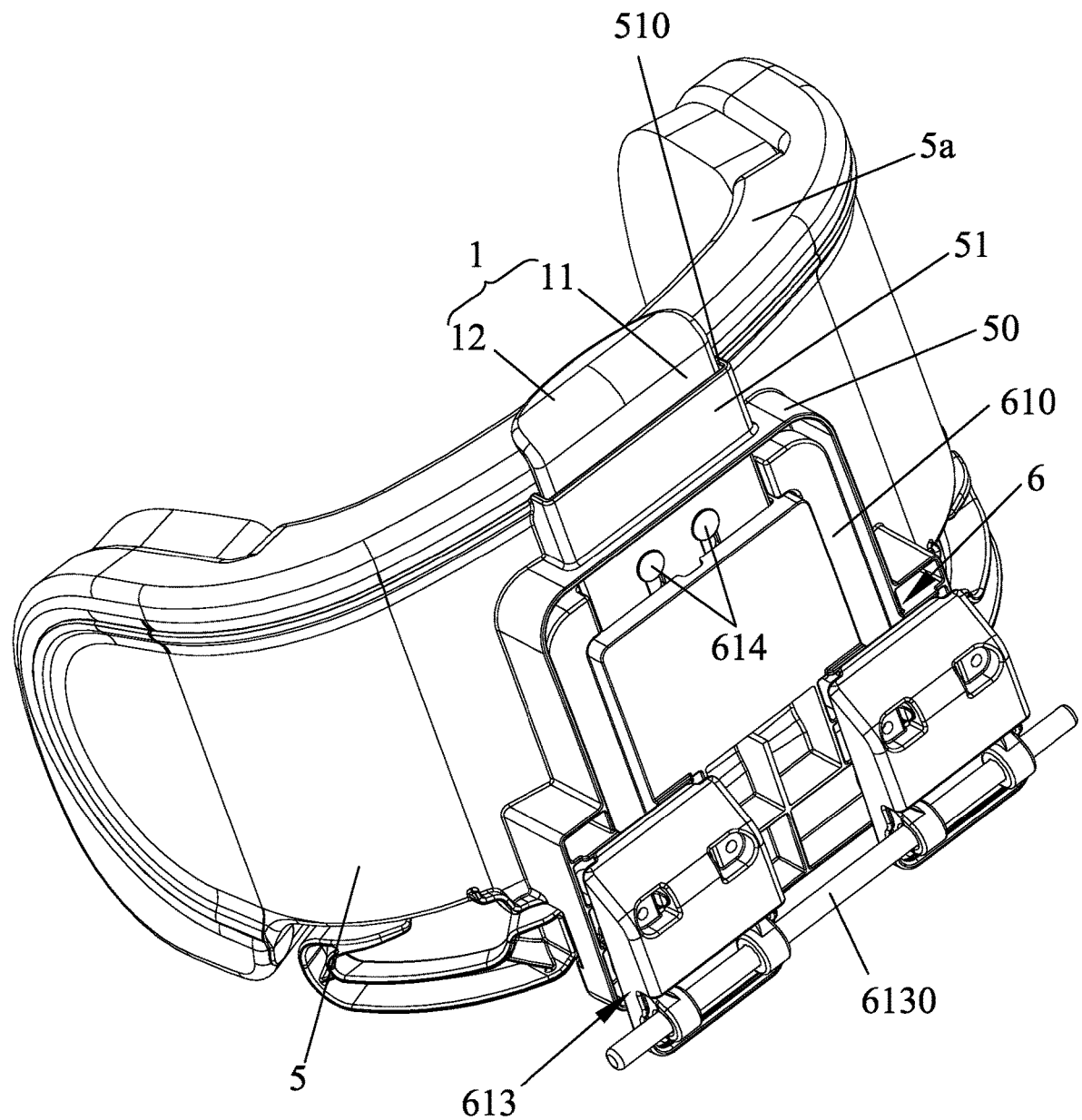
FIG. 2 is another perspective view of the seating device viewed in a different direction, which illustrates an operating unit in anon-operative state.
Figure 3:
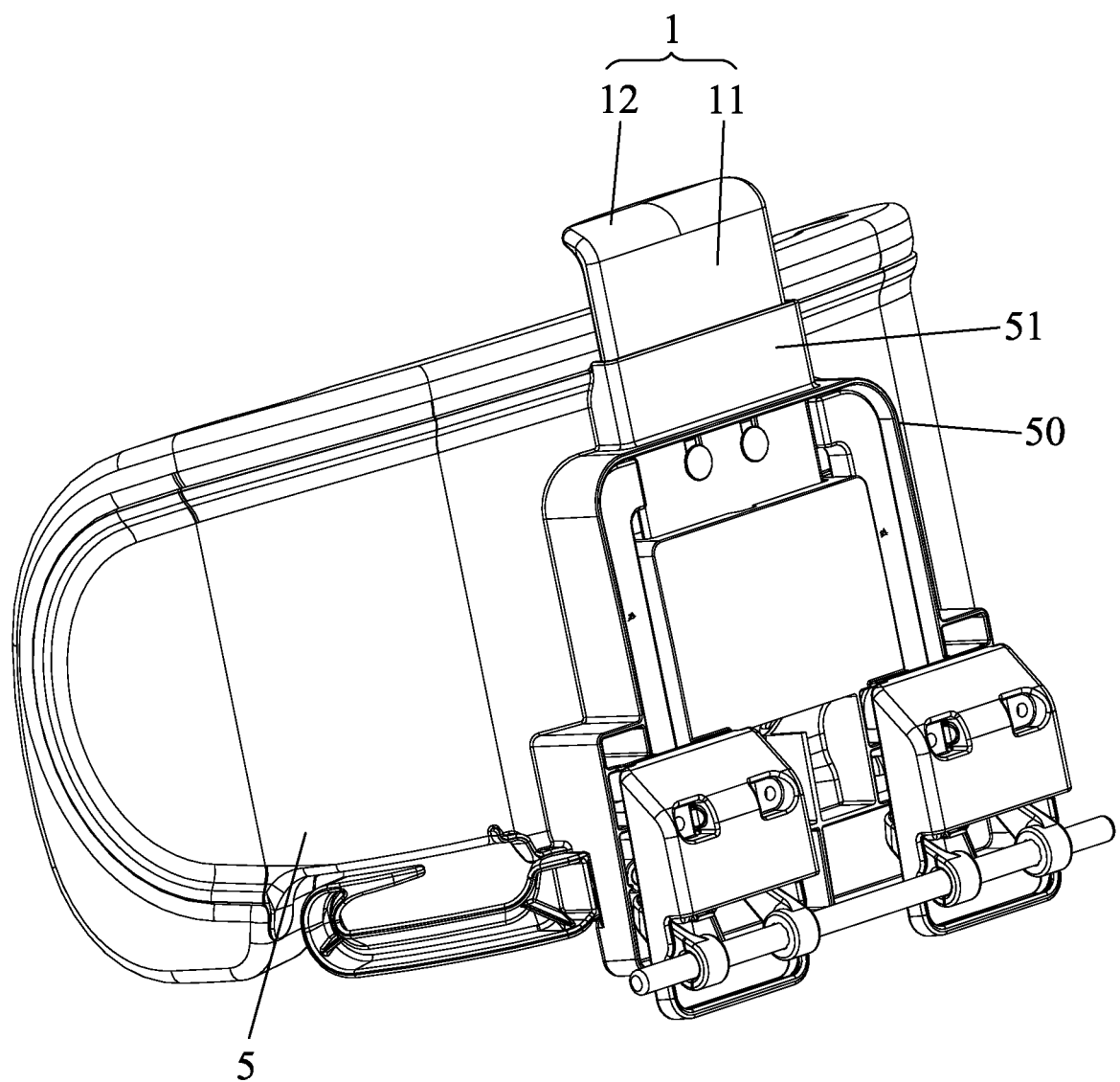
FIG. 3 is a view similar to FIG. 2, but illustrating the operative unit in an operative state.

FIGS. 1 to 3 illustrate a seating device 100 according to an embodiment of the disclosure. The seating device 100 includes a seat body 4, a headrest 5, an adjustment mechanism 6, and an operating unit 1.

The seat body 4 is mounted on a base 7 and has a backrest portion 41.

Figure 4:
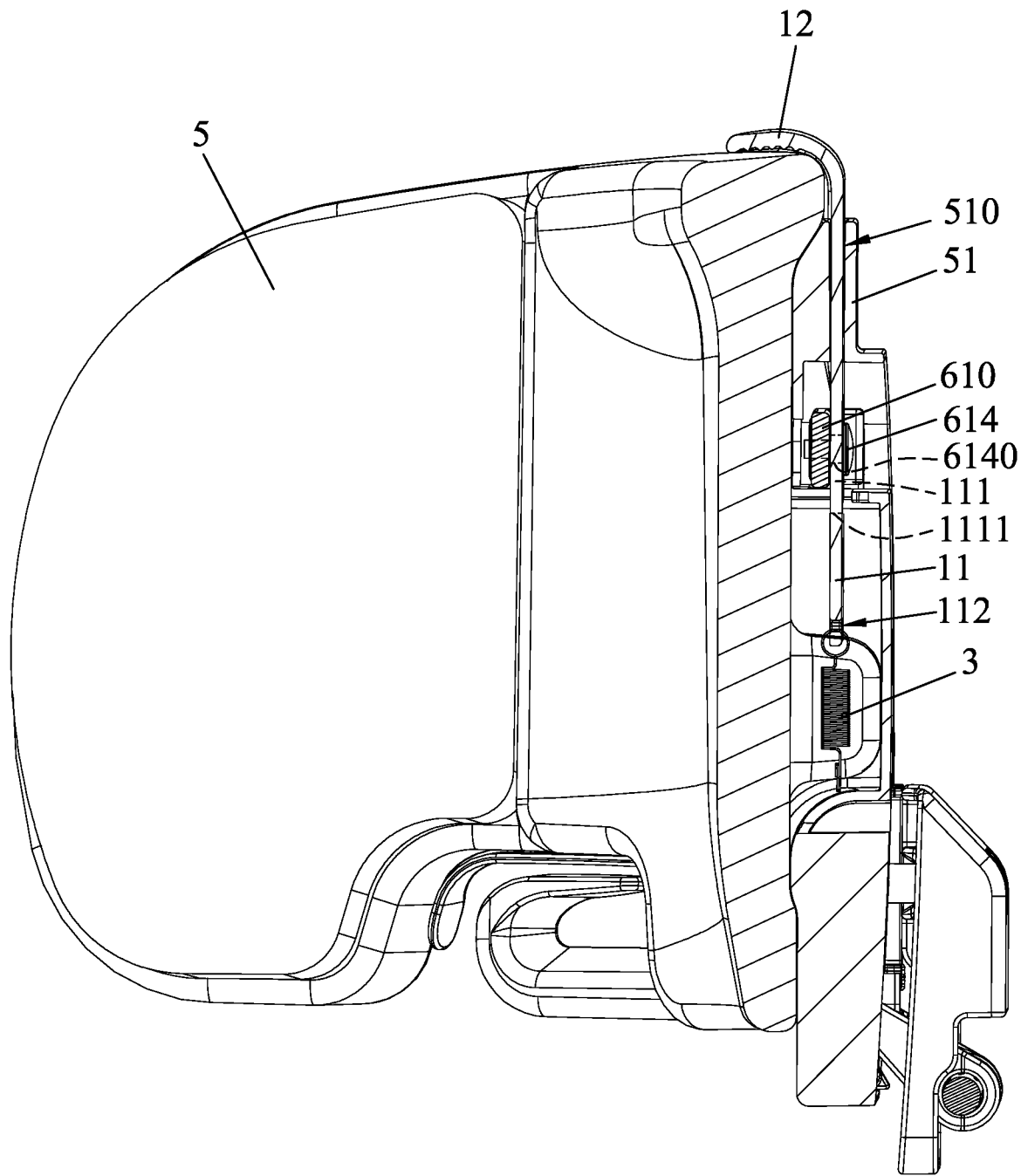
FIG. 4 is a sectional view of FIG. 2.

The headrest 5 is movably connected to the backrest portion 41 of the seat body 4. As shown in FIGS. 2 to 4, the headrest 5 has a guide member 51 disposed below a top end 5a of the headrest 5. The guide member 51 has a guide groove 510 extending in a top-bottom direction, and is integral with a generally U-shaped guide frame 50 fixed to the back side of the headrest 5.

Figure 9:
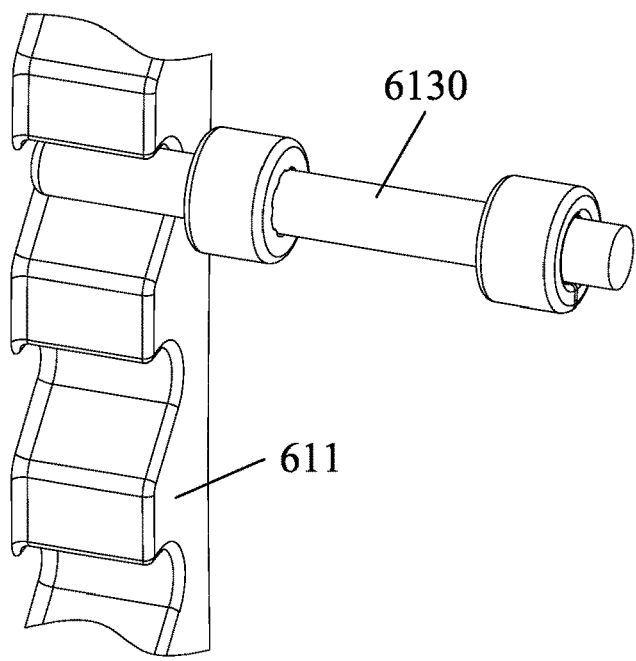
FIG. 9 is a fragmentary perspective view illustrating first and second locking units of the adjustment mechanism being interlocked.

The adjustment mechanism 6 is connected between the seat body 4 and the headrest 5 to adjust the height or position of the headrest 5 relative to the seat body 4. The adjustment mechanism 6 includes a first locking unit 611 (see FIG. 1), a driven member 610 and a second locking unit 613. The first locking unit 611 is formed as a toothed rack mounted to the backrest portion 41 of the seat body 4. The driven member 610 is U-shaped and movably mounted to the headrest 5. The second locking unit 613 is connected to the driven member 610 and has a tooth-engaging shaft 6130 (see FIG. 2) interlockable with the first locking unit (the toothed rack) 611 to lock the headrest 5 against movement relative to the seat body 4 (FIGS. 1 and 9). Further structural details of the adjustment mechanism 6 are not intended to be disclosed herein as they are irrelevant to the scope of protection to be sought by the present disclosure.

Figure 5:
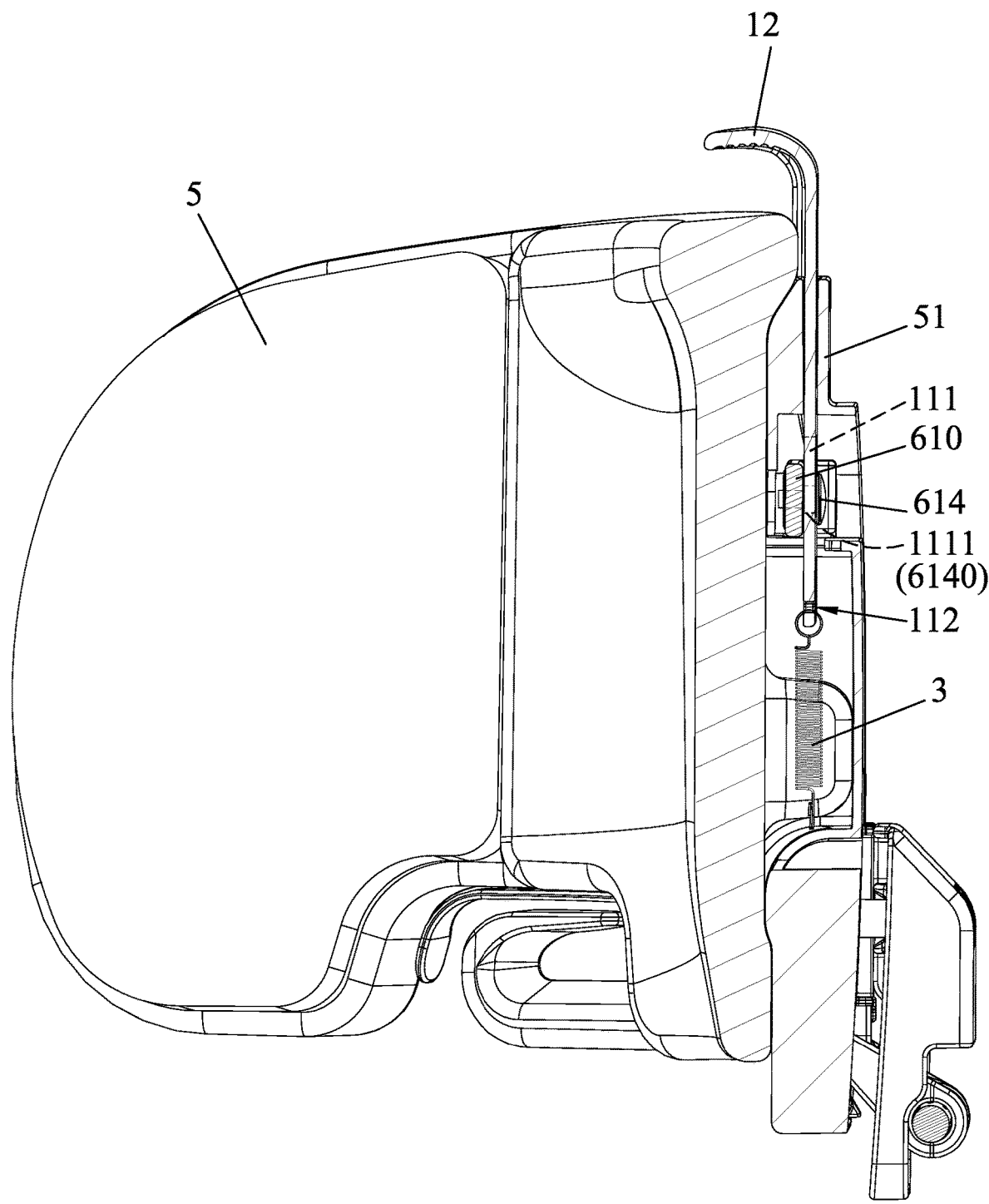
FIG. 5 is a sectional view of FIG. 3.

The operating unit 1 is movably mounted to the headrest 5, and has a driving member 11 to actuate the driven member 610, and a handle portion 12 bending from the driving member 11. As shown in FIGS. 3, 4 and 5, the driving member 11 slidably extends downward through the guide groove 510 from the handle portion 12. The driving member 11 is movable along the guide groove 510 between a non-operative position and an operative position.

In the non-operative position, the driving member 11 is inoperative to transmit an actuation movement of the handle portion 12 to the driven member 610 of the adjustment mechanism 6. In the operative position, the driving member 11 is operative to transmit the actuation movement to the driven member 610.

Figure 6:
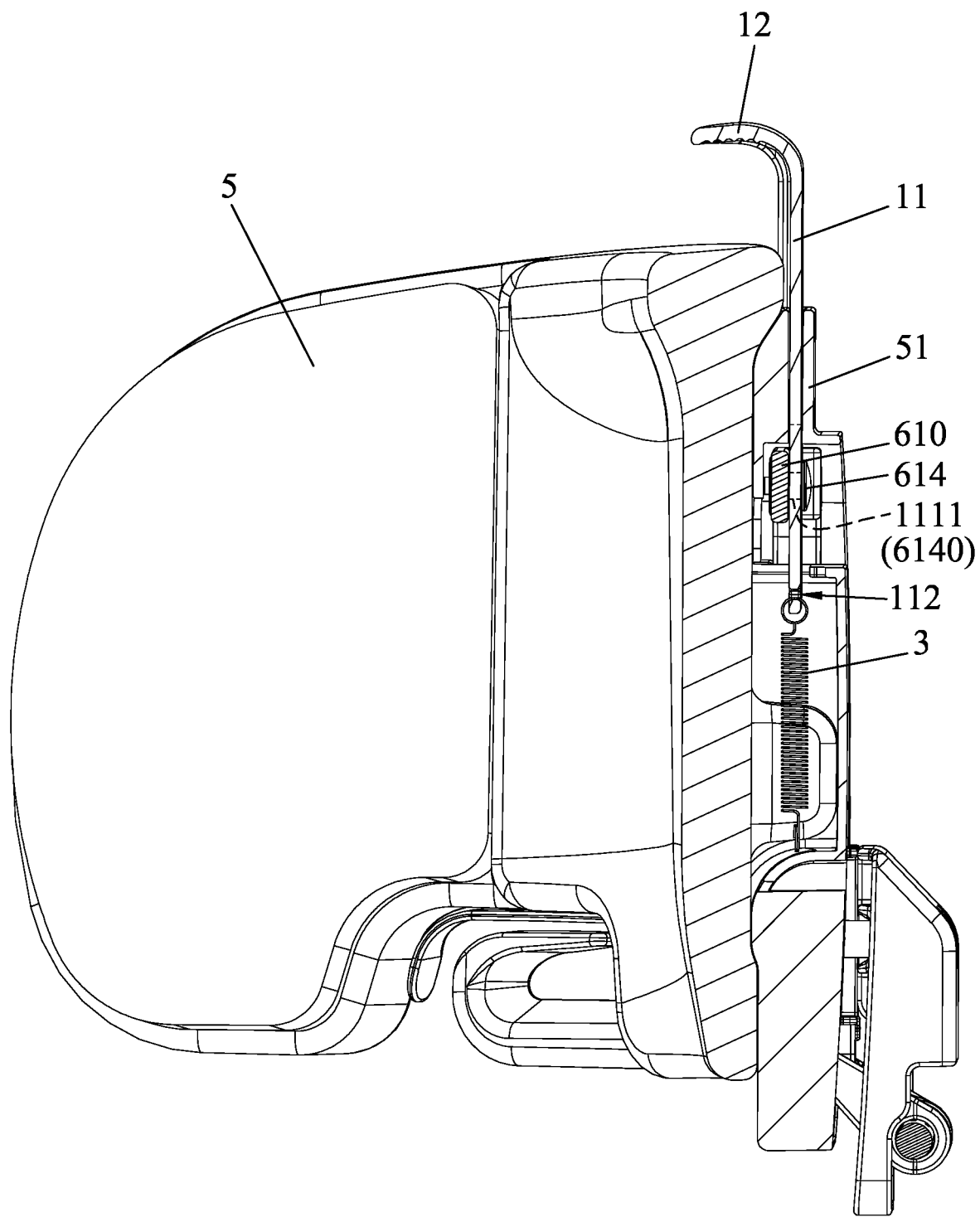
FIG. 6 is a sectional view illustrating a spring tensioned by the operating unit in the operative state.
Figure 7:
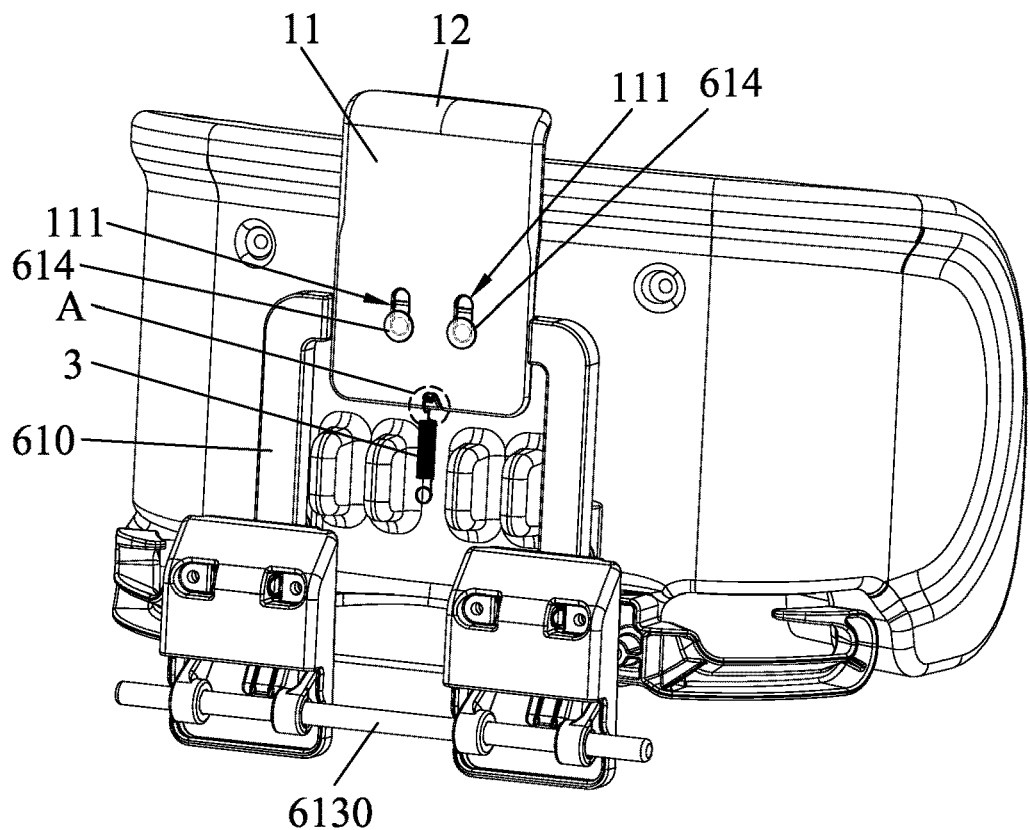
FIG. 7 is a perspective view illustrating a driving member of the operating unit being fully uncovered.
Figure 8:
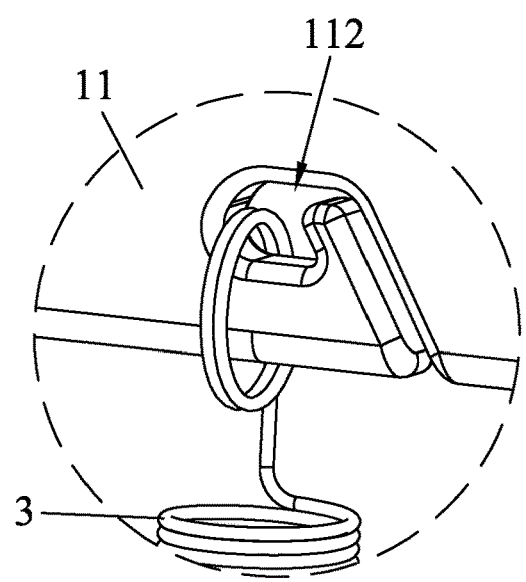
FIG. 8 is an enlarged view of an encircled portion of FIG. 7.

As shown in FIGS. 2, 6 and 7, the driving member 11 has two engaging holes 111. The driven member 610 has two engaging pins 614 (see FIG. 7). The driving member 11 is movably connected to the driven member 610 of the adjustment mechanism 6 by inserting the engaging pins 614 into the respective engaging holes 111.

Each engaging hole 111 is elongated in a top-bottom direction and has a hole boundary. Each engaging pin 614 is slidable along the respective engaging hole 111. The driving member 11 has active transmitting parts 1111, each of which is situated at a bottom side of the hole boundary of the respective engaging hole 111. The driven member 610 has passive transmitting parts 6140 each of which is situated at a bottom side of one of the engaging pin 614 and faces the active transmitting part 1111 of the respective engaging hole 111.

The term "active transmitting part" used herein refers to a part of the driving member 11, at which the actuation movement is delivered to the driven member 610. The term "passive transmitting part" used herein refers to a part of the driven member 610 at which the actuation movement is received by the driven member 610. The active transmitting parts 1111 of the driving member 11 engage the respective passive transmitting parts 6140 of the driven member 610 in the operative position and disengage from the respective passive transmitting parts 6140 in the non-operative position.

Specifically, as shown in FIGS. 3, 5 and 6, when the driving member 11 is in the operative position, the handle portion 12 is spaced away and protrudes from the outer surface of the top end 5a of the headrest 5. As the passive transmitting parts 6140 of the engaging pins 614 respectively engage the active transmitting parts 1111 of the engaging holes 111, the actuation movement to actuate the driven member 610 can be transmitted by the driving member 11 from the handle portion 12 to the driven member 610.

Referring to FIGS. 4 to 8, the seating device 100 further includes a resilient member 3 for urging the driving member 11 to move to the non-operative position. In this embodiment, the resilient member 3 connects between the driving member 11 and the headrest 5, and normally applies a downward urging force to the driving member 11. The resilient member 3 is, but not limited to, a coiled spring that has an end extending into the engaging hole 112 so as to be attached to the driving member 11. Another end of the resilient member 3 is attached to the headrest 5.

As shown in FIGS. 2 and 4, when the driving member 11 is in the non-operative position, the handle portion 12 abuts against the outer surface of the top end 5a of the headrest 5 due to the downward urging force of the resilient member 3. The driving member 11 is inoperative to transmit the actuation movement to the driven member 610 of the adjustment mechanism 6. The driving member 11 is inoperative because the active transmitting parts 1111 of the engaging holes 111 disengage from the respective passive transmitting parts 6140 of the engaging pins 614. As the engaging holes 111 are moved downwardly together with the driving member 11 by the biasing action of the resilient member 3, top sides of the engaging pins 614 respectively engage top sides of the hole boundaries of the engaging holes 111. The top sides of the engaging holes 111 are not active transmitting parts 1111 of the driving member 11, and the top sides of the engaging pins 614 are not passive transmitting parts of the driven member 610. This is because the actuation movement of the handle portion 12 is neither delivered by the driving member 11 at the top sides of the engaging holes 111, nor received by the driven member 610 at the top sides of the engaging pins 614. The actuation movement will cause separation of the top sides of the engaging holes 111 from the topsides of the respective engaging pins 614.

In the operative position, as the handle portion 12 is spaced away from the outer surface of the headrest 5 against the biasing action of the resilient member 3, handling of the handle portion 12 may be facilitated.

Figure 10:
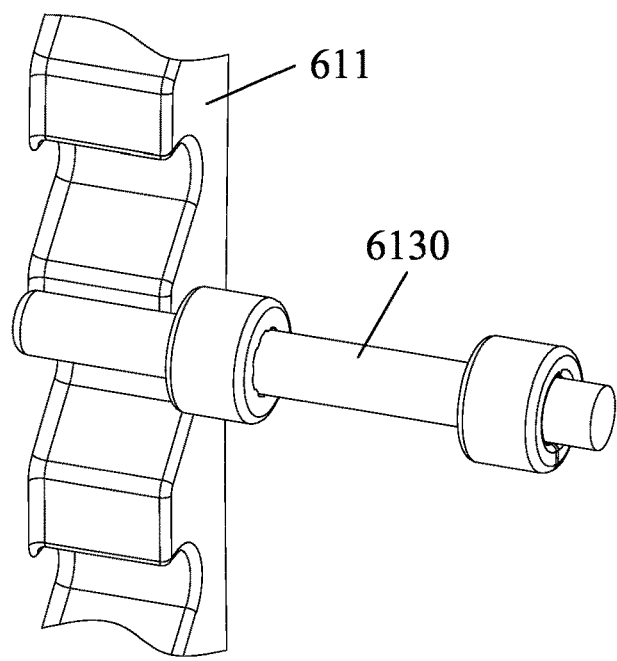
FIG. 10 is similar to FIG. 9, but illustrating the first and second locking unit being uninterlocked.

For operating the operating unit 1 to adjust the position of the headrest 5 relative to the seat body 4, the handle portion 12 may be pulled upward away from the top end 5a of the headrest 5. In this situation, the driving member 11 is moved upward so that the engaging pins 614 engage the active transmitting parts 1111 of the hole boundaries of the respective engaging holes 111. Upon continued upward pulling of the handle portion 12, the driven member 610 is moved upward by the driving member 11 so that the tooth engaging shaft 6130 of the second locking unit 613 is uninterlocked with the toothed rack of the first locking unit 611 (see FIG. 10). Thus, movement of the headrest 5 relative to the seat body 4 is allowed for height adjustment. As the handle portion 12 is moved upward, the resilient member 3 is tensioned between the driving member 11 and the seat body 4 to store a restoring force. After the height of the headrest 5 relative to the seat body 4 is adjusted, the handle portion 12 may be released so that it is returned to abut against the top end 5a of the headrest 5 by the restoring force of the resilient member 3. Therefore, the handle portion 12 is prevented from being accidentally pulled upward when the driving member 11 is in the non-operative position. Due to the handle portion 12 normally placed in a non-protruding position, the seating device 100 has an improved aesthetic appearance compared to the prior art having protruding operating handles or knobs.

While the engaging holes 111 are provided in the driving member 11 and the engaging pins 614 are provided in the driven member 610 in this embodiment, according to other embodiments, the engaging holes may be provided in the driven member 610, and the engaging pins may be provided in the driving member 11. In this case, the active transmitting part of the driving member 11 is situated at the top side of the engaging pin, and the passive transmitting part of the driven member 610 is situated at the top side of the engaging hole.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is considered the exemplary embodiment, it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A seating device comprising:
   a seat body;
   a headrest movably connected to said seat body;
   an adjustment mechanism connected between said seat body and said headrest to adjust a position of said headrest relative to said seat body; and
   an operating unit movably mounted to said headrest and having a driving member to actuate said adjustment mechanism, and a handle portion bending from said driving member, said driving member being movable between a non-operative position and an operative position,
   wherein, when said driving member is in the non-operative position, said handle portion abuts against an outer surface of said headrest, and said driving member is inoperative to transmit an actuation movement from said handle portion to said adjustment mechanism for actuating said adjustment mechanism, and
   wherein, when said driving member is in the operative position, said handle portion is spaced away and protrudes from said outer surface, and said driving member is operative to transmit the actuation movement to said adjustment mechanism.

2. The seating device as claimed in claim 1, further comprising a resilient member urging said driving member to move to the non-operative position.

3. The seating device as claimed in claim 2, wherein said adjustment mechanism includes a driven member movably mounted to said headrest, said driving member having an active transmitting part, said driven member having a passive transmitting part that engages said active transmitting part in the operative position and disengages from said active transmitting part in the non-operative position, said driving member being able to transmit the actuation movement to said driven member when said passive transmitting part engages said active transmitting part.

4. The seating device as claimed in claim 3, wherein one of said driving and driven members has an engaging hole, the other one of said driving and driven members having an engaging pin inserted into said engaging hole, said active transmitting part being situated at one of said engaging hole and pin, said passive transmitting part being situated at the other one of said engaging hole and pin.

5. The seating device as claimed in claim 4, wherein said engaging hole is elongated and surrounded by a hole boundary, said engaging pin being slidable within said engaging hole.

6. The seating device as claimed in claim 5, wherein said driving member has said engaging hole, said driven member having said engaging pin.

7. The seating device as claimed in claim 6, wherein said handle portion abuts against said outer surface disposed at atop end of said headrest when said driving member is in the non-operative position, and is spaced away from said top end of said headrest to protrude upwardly when said driving member is in the operative position.

8. The seating device as claimed in claim 7, wherein said engaging hole is elongated in a top-bottom direction of said headrest, said active transmitting part being situated at a bottom side of said hole boundary of said engaging hole.

9. The seating device as claimed in claim 8, wherein said resilient member normally applies a downward urging force to said driving member.

10. The seating device as claimed in claim 2, wherein said resilient member connects between said driving member and said headrest.

11. The seating device as claimed in claim 10, wherein said driving member has a connection hole, said resilient member having an end extending into said connection hole so as to be attached to said driving member.

12. The seating device as claimed in claim 7, wherein said headrest further has a guide member having a guide groove extending in a top-bottom direction, said driving member slidably extending downward through said guide groove from said handle portion.

13. The seating device as claimed in claim 3, wherein said adjustment mechanism further includes a first locking unit mounted to said seat body, and a second locking unit connected to said driven member and interlockable with said first locking unit to lock said headrest against movement relative to said seat body, said second locking unit being uninterlocked with said first locking unit to allow movements of said headrest relative to said seat body when said driving member actuates said driven member.

* * * * *